(12) United States Patent
Chang et al.

(10) Patent No.: US 7,777,975 B2
(45) Date of Patent: Aug. 17, 2010

(54) LENS MODULE

(75) Inventors: Jen-Tsorng Chang, Taipei Hsien (TW); Chau-Yuan Ke, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/349,613

(22) Filed: Jan. 7, 2009

(65) Prior Publication Data

US 2009/0290240 A1    Nov. 26, 2009

(30) Foreign Application Priority Data

May 21, 2008    (CN)    ................. 2008 1 0301710

(51) Int. Cl.
*G02B 7/02*    (2006.01)
(52) U.S. Cl. ...................................... 359/811; 359/813

(58) Field of Classification Search ................. 359/811, 359/813, 819, 821, 822, 823, 827
See application file for complete search history.

(56) References Cited

U.S. PATENT DOCUMENTS

| 7,498,729 B2 * | 3/2009 | Ogino ........................ 310/800 |
| 7,567,401 B2 * | 7/2009 | Lee et al. .................. 360/73.03 |
| 2009/0147340 A1 * | 6/2009 | Lipton et al. ................ 359/230 |

* cited by examiner

*Primary Examiner*—Timothy J Thompson
(74) *Attorney, Agent, or Firm*—Clifford O. Chi

(57) ABSTRACT

A lens module includes a lens barrel, a first lens, a plurality of first electro-active polymer (EAP) units and a plurality of second EAP units. The first lens is suspended in the lens barrel by the plurality of first EAP units and second EAP units. The lens barrel receives a second lens, a spacer and a third lens. The second lens and the third lens are spaced apart by the spacer.

17 Claims, 7 Drawing Sheets

LENS MODULE

BACKGROUND

1. Field of the Invention

The disclosure relates to lens modules, and particularly to a lens module with a simplified mechanism.

2. Description of Related Art

Lens modules are widely used in various image capturing devices such as digital cameras and mobile phones. Such a lens module typically includes a lens barrel and lenses assembled therein. Recently, lens modules have begun to integrate autofocus mechanisms, such as step motors for moving the lenses relative to the image sensor module, thereby achieving the autofocus function. However, the step motor is relatively bulky in volume, compromising efforts to minimize device dimensions.

Therefore, a lens module is desired to overcome the limitations described.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the present mold separating device. Moreover, in the drawings, like reference numerals designate corresponding parts throughout the several views.

DETAILED DESCRIPTION OF CERTAIN INVENTIVE EMBODIMENTS

Embodiments of the present lens module will now be described in detail with reference to the drawings.

Figure 1:
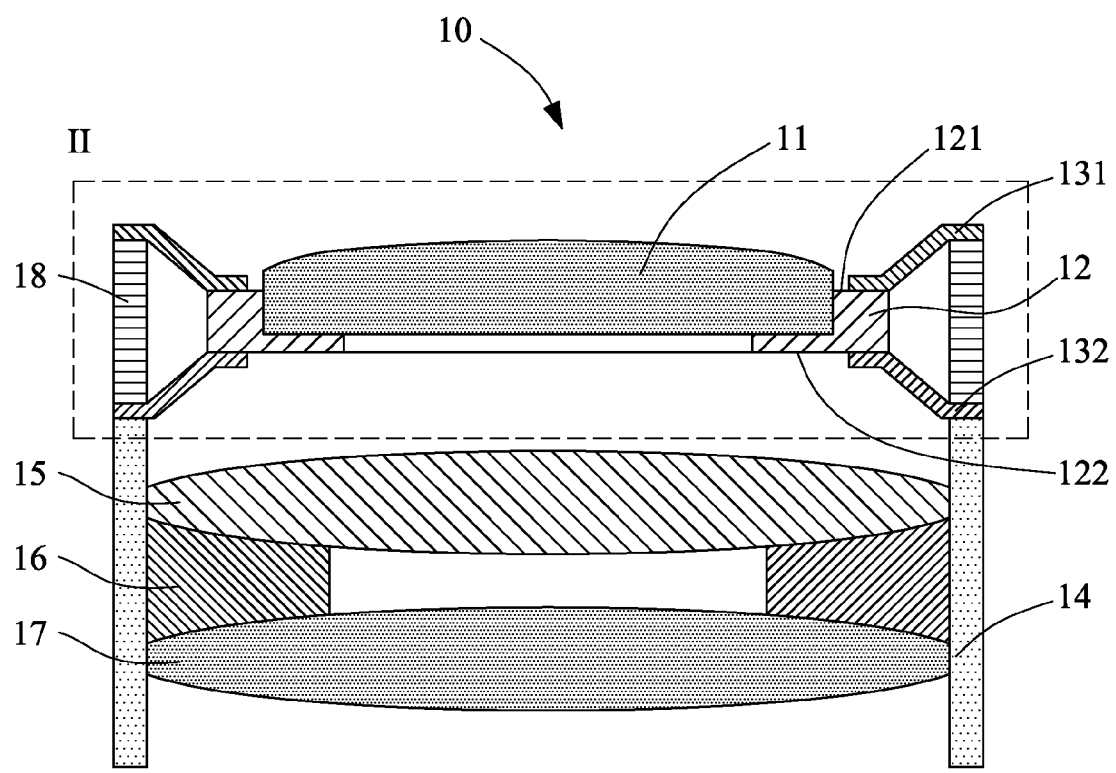
FIG. 1 is a cross-sectional view of a lens module according to a first embodiment.
Figure 2:
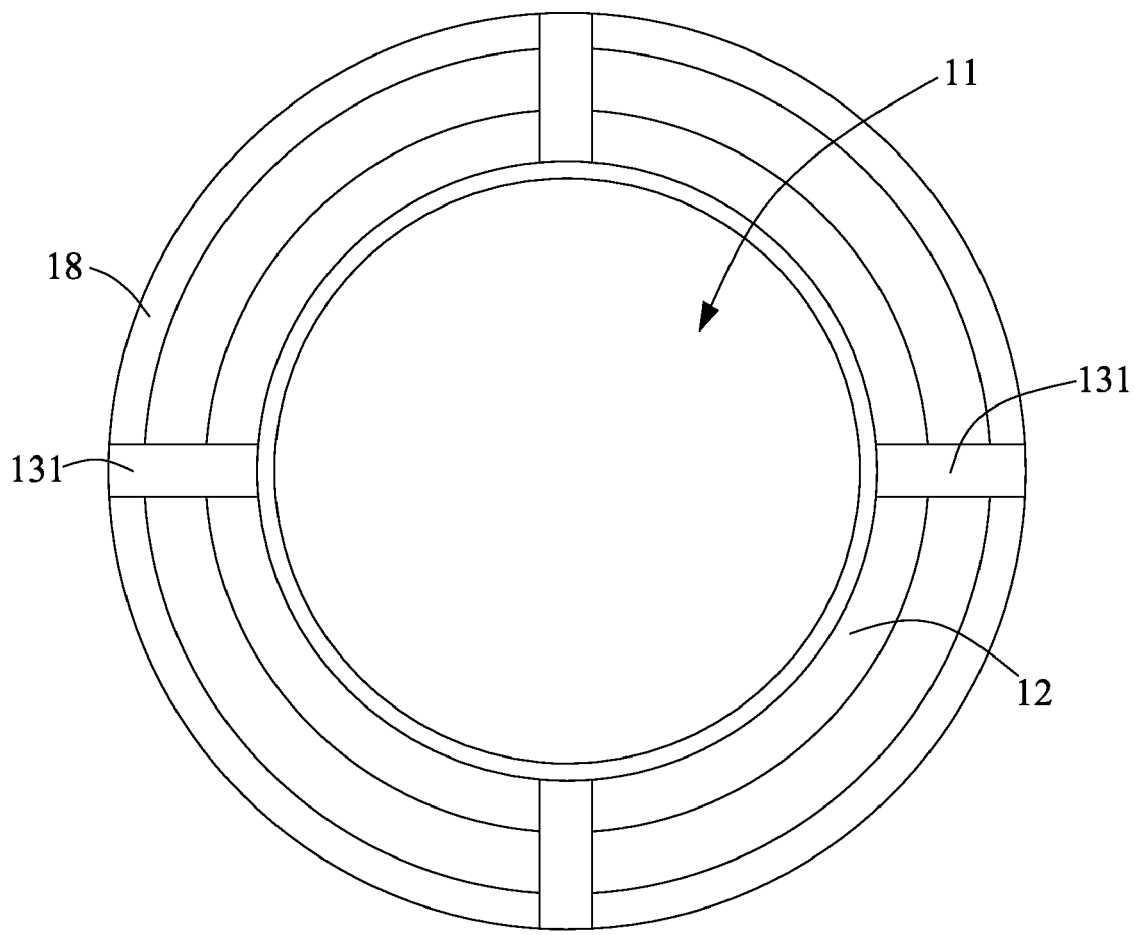
FIG. 2 is a top view of an encircled portion II of FIG. 1.

Referring to FIGS. 1 and 2, a lens module 10 according to a first embodiment includes a first lens 11, a lens holder 12, a number of first electro-active polymer (EAP) units 131, a number of second EAP units 132, a lens barrel 14, and a bracket 18.

The lens barrel 14 receives a second lens 15, a spacer 16 and a third lens 17. The bracket 18 is attached to an end portion of the lens barrel 14. The first lens 11 is suspended in the bracket 18 by a number of first EAP units 131, a number of second EAP units 132 and the lens holder 12. An image is captured on a light-sensing unit (not shown) through the first lens 11, second lens 15 and the third lens 17.

The disclosed EAP units can be made dielectric elastomer or ferroelectric polymer. The ferroelectric polymer is polyvinylidene fluoride (PVDF) and nylon.

The lens holder 12 is circular. The outer diameter of the lens holder 12 is less than the inner diameter of the lens barrel 14. The lens holder 12 includes a first surface 121 and a second surface 122 opposite thereto. The first lens 11 is fixed on the lens holder 12 by glue.

One end of first EAP units 131 are attached to the first surface 121 of the lens holder 12, another end of first EAP units 131 are attached to one end of the bracket 18. One end of second EAP units 132 are attached to the second surface 122 of the lens holder 12, another end of second EAP units 132 are attached to another end of the bracket 18. First EAP units 131 are aligned with second EAP units 132 respectively. Thus the first lens 11 and the lens holder 12 are suspended in the bracket 18. First EAP units 131 and second EAP units 132 are attached to the lens holder 12 and the bracket 18 by glue or thermal fusion. The lens holder 12 is retained in balance with a downward force of first EAP units 131 and an upward force of second EAP units 132.

The second lens 15 and the third lens 17 are spaced apart by the spacer 16. The second lens 15 and the third lens 17 are fixed to the lens barrel 14 by glue.

First EAP units 131 and second EAP units 132 can be made of intelligent material, such that shape or size thereof changes when a voltage is applied thereto, and return to their original state when the voltage is withdrawn.

When first EAP units 131 receive the voltage, the shape or size of first EAP units 131 are changed, i.e., first EAP units 131 is elongated, forcing lens holder 12 downward along the axis thereof. However, second EAP units 132 of the second surface 122, not receiving voltage, undergo no change in shape or size, and upward force from second EAP units 132 is less than the downward force generated from first EAP units 131. Accordingly, the first lens 11 moves downwardly along the axis.

When first EAP units 131 or second EAP units 132 receive no voltage, the shape and size thereof return to their original state. Thereafter, the lens holder 12 and the first lens 11 are returned to original state in sequence.

When first EAP units 131 or second EAP units 132 receive the voltage, the first lens 11 moves downward or upward. First EAP units 131 or second EAP units 132 change a distance between the first lens 11 and the second lens 15 for purposes of focusing.

Figure 3:
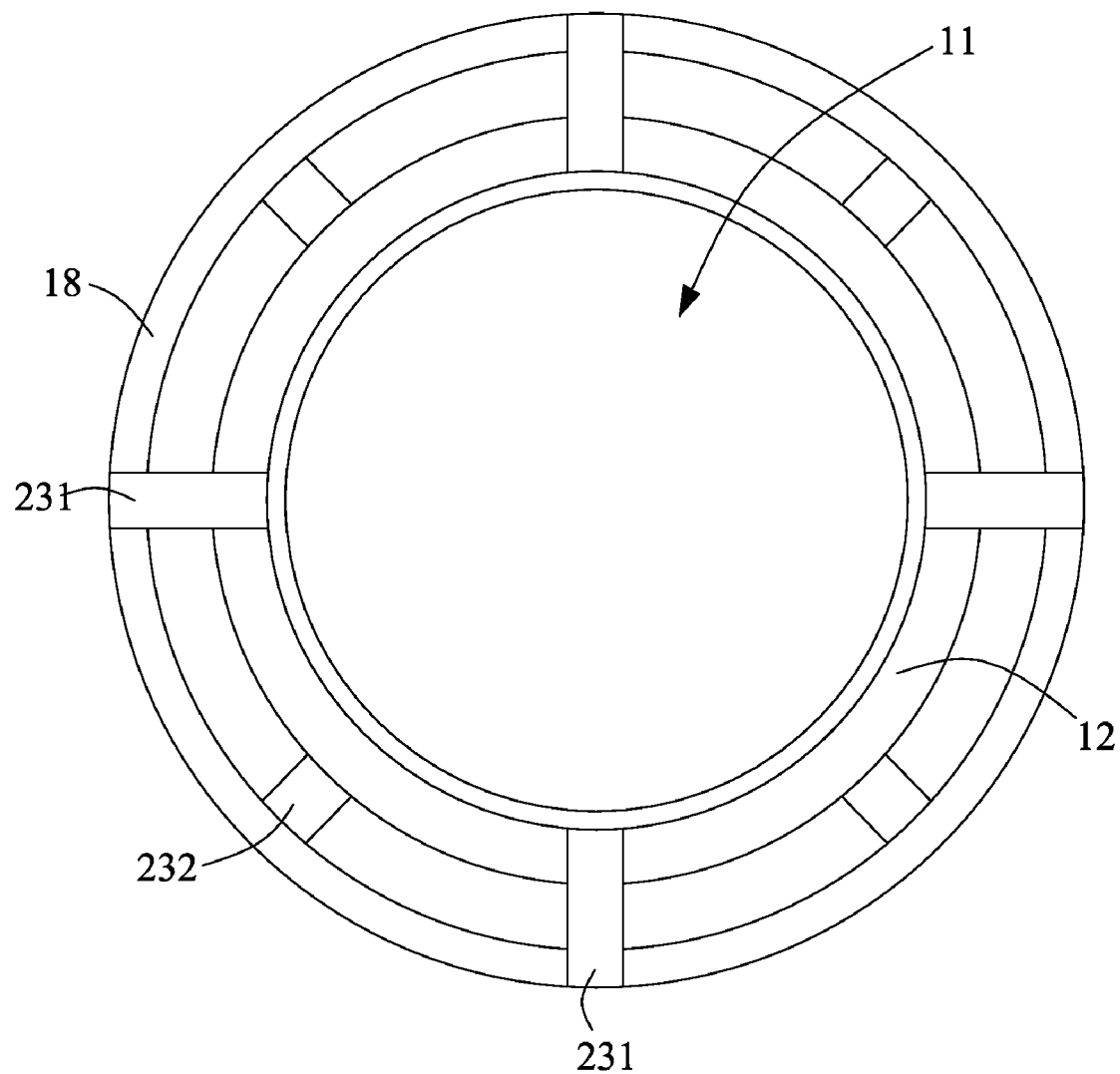
FIG. 3 is a top view of a lens module according to a second embodiment.

FIG. 3 is a top view according to a second embodiment, differing from that of FIG. 2 only in that each second EAP units 232 is arrayed uniformly between every two adjacent first EAP units 231. Each of first EAP units 231 is also arrayed uniformly. First EAP units 231 are attached to the first surface of the lens holder 12. Second EAP units 232 are attached to the second surface of the lens holder 12. The number of first EAP units 231 and second EAP units 232 is four respectively.

Figure 4:
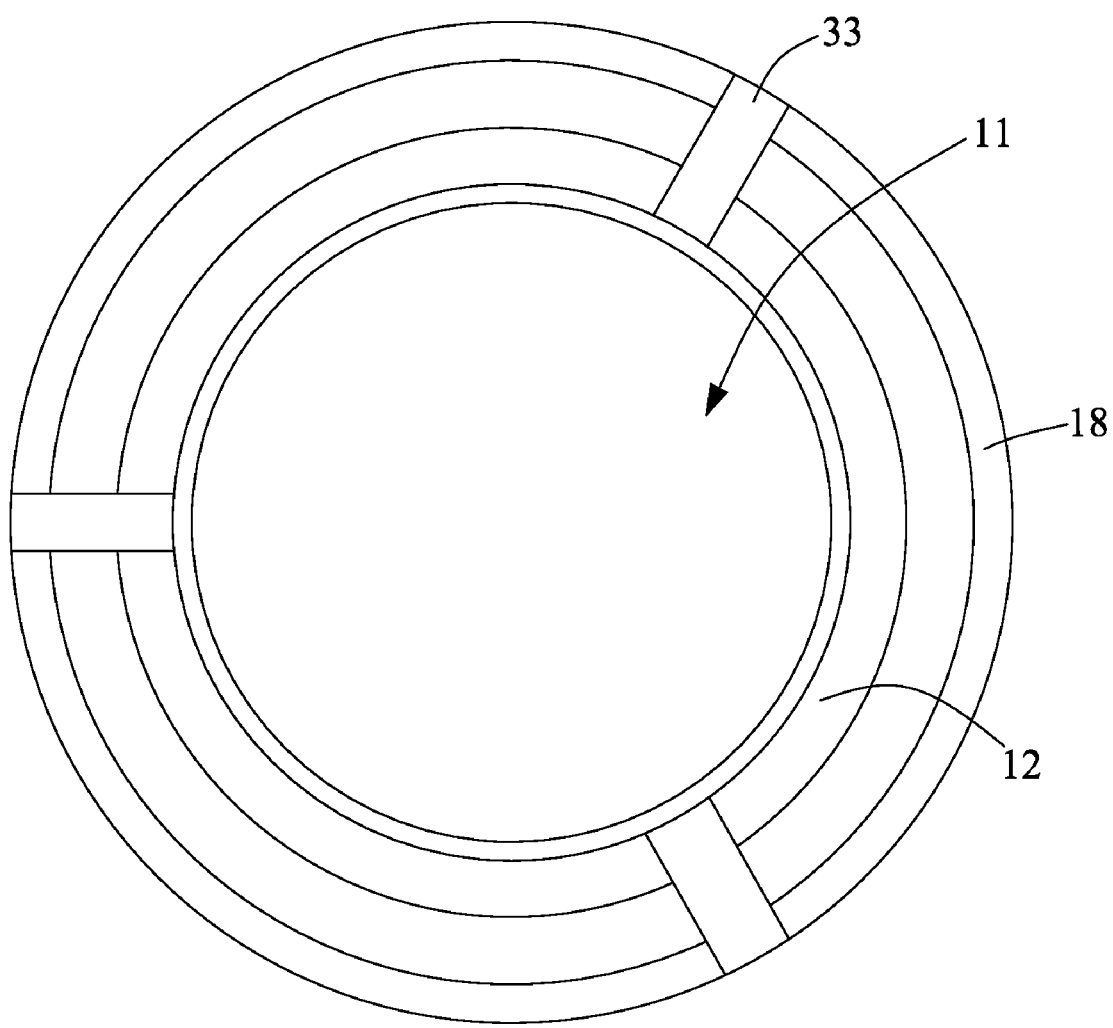
FIG. 4 is a top view of a lens module according to a third embodiment.

FIG. 4 is a top view according to a third embodiment, differing from FIG. 2 only in that three uniformly arrayed EAP units 33 are attached to the first surface and the second surface of the lens holder 12 respectively. The angle between every two adjacent EAP units 33 is 120 degrees.

Figure 5:
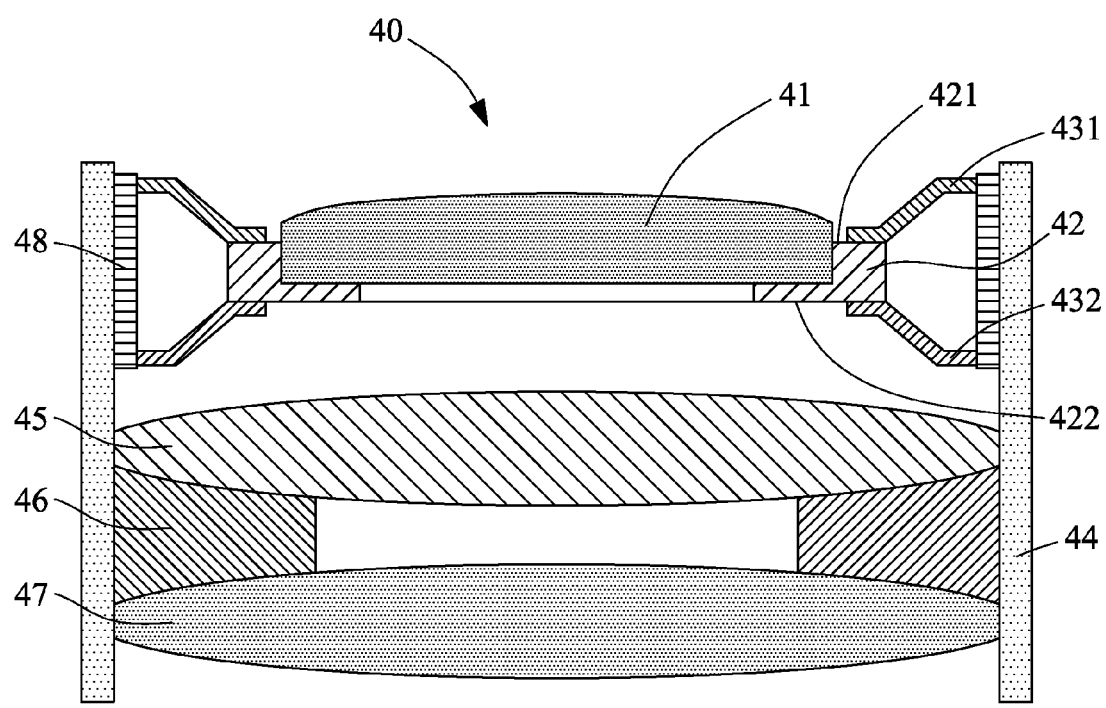
FIG. 5 is a cross-sectional view of a lens module according to a fourth embodiment.

FIG. 5 is a cross-sectional diagram showing the lens module 40 in accordance with a fourth embodiment. A lens module 40 includes a first lens 41, a lens holder 42, a number of first electro-active polymer (EAP) units 431, a number of second EAP units 432, a lens barrel 44, a second lens 45, a spacer 46, a third lens 47, and a bracket 48.

First EAP units 431 are arrayed uniformly and attached to a first surface 421 of the lens holder 42. Second EAP units 432 are arrayed uniformly and attached to a second surface 422 opposite to the first surface 421. First EAP units 431 are aligned with second EAP units 432 respectively.

The first lens 41 is fixed on the lens holder 42 by glue. One end of first EAP units 431 are attached to the first surface 421 of the lens holder 42, another end of first EAP units 431 are attached to one end of the bracket 48. One end of second EAP units 432 are attached to the second surface 422 of the lens holder 42, another end of second EAP units 432 are attached to another end of the bracket 48. Thus the first lens 41 and the lens holder 42 are suspended in the bracket 48. First EAP units 431 and second EAP units 432 are fixed to the lens holder 42 and the bracket 48 by glue or thermal fusion.

The difference between the lens module 40 and lens module 10 is that the bracket 48 is attached to the inner side of the lens barrel 44. Thus, the first lens 41 and the lens holder 42 are received in the lens barrel 44.

Figure 6:
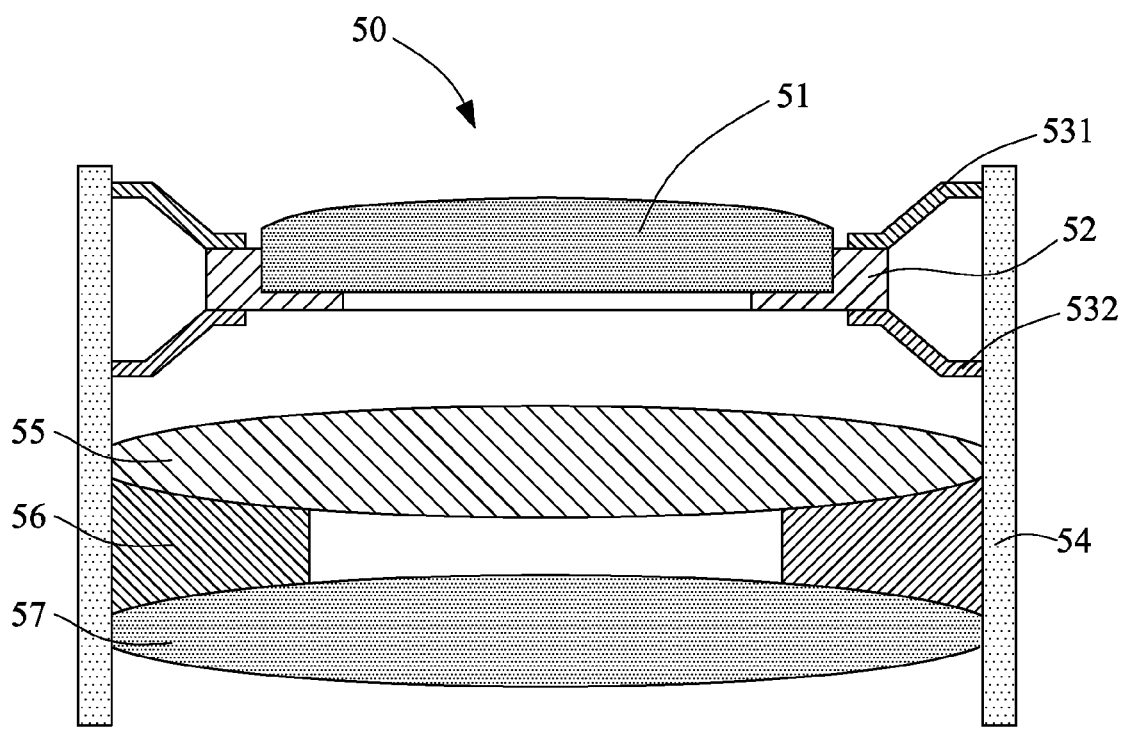
FIG. 6 is a cross-sectional view of a lens module, according to a fifth embodiment.

FIG. 6 is a cross-sectional diagram showing the lens module 50 in accordance with a fifth embodiment. A lens module 50 includes a first lens 51, a lens holder 52, a number of first EAP units 531, a number of second EAP units 532, a lens barrel 54, a second lens 55, a spacer 56, and a third lens 57.

The difference between the lens module 50 and lens module 40 is that one end of first EAP units 531 and second EAP units 532 are attached to the inner side of the lens barrel 54.

Figure 7:
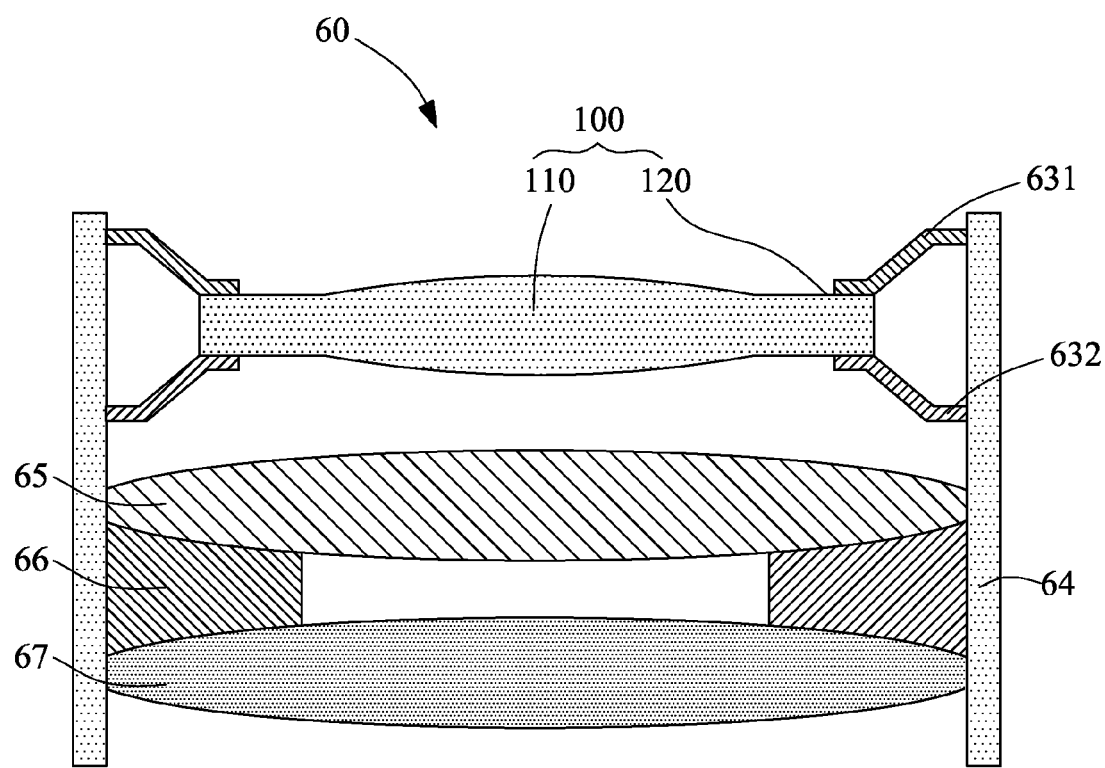
FIG. 7 is a cross-sectional view of a lens module, according to a sixth embodiment.

FIG. 7 is a cross-sectional diagram showing the lens module 60 in accordance with a sixth embodiment. A lens module 60 includes a first lens 100, a number of first EAP units 631, a number of second EAP units 632, a lens barrel 64, a second lens 65, a spacer 66, a third lens 67.

The first lens 100 includes an optical portion 110 and an edge portion 120. The optical portion 110 is encircled by the edge portion 120. One end of each first EAP units 631 and each second EAP units 632 are attached to the edge portion 120. Another end of each first EAP units 631 and each second EAP units 632 are attached to the inner side of the lens barrel 64. Thus the first lens 100 is suspended in the lens barrel 64 through first EAP units 631 and second EAP units 632.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module, comprising:
   a first lens;
   a lens holder coupled to the first lens, the lens holder comprising a first surface and an opposite second surface;
   a plurality of first electro-active polymer (EAP) units and a plurality of second EAP units, the first and second EAP units being arranged in a staggered fashion, wherein the first surface of the lens holder is coupled to one end of the first EAP units and the second surface of the lens holder is coupled to one end of the second EAP units;
   a bracket coupled to the first EAP units and second EAP units; and
   a lens barrel coupled to the bracket.

2. The lens module of claim 1, wherein the lens barrel is fixed to one end of the bracket.

3. The lens module of claim 1, wherein the bracket is fixed to an inner side of the lens barrel.

4. The lens module of claim 1, wherein the first EAP units and second EAP units comprise dielectric elastomer or ferroelectric polymer comprising the polyvinylidene fluoride (PVDF) and nylon.

5. The lens module of claim 1, further comprising a second lens fixedly received in the lens barrel.

6. A lens module, comprising:
   a first lens;
   a lens holder coupled to the first lens, the lens holder comprising a first surface and an opposite second surface;
   a plurality of first EAP units and a plurality of second EAP units coupled to the first and second surfaces of the lens holder with one end of the first and second surfaces, respectively, the first and second EAP units being arranged in a staggered fashion; and
   a lens barrel coupled to the first EAP units and the second EAP units.

7. The lens module of claim 6, wherein the first EAP units and the second EAP units are dielectric elastomer or ferroelectric polymer comprising the PVDF and nylon.

8. The lens module of claim 6, further comprising a second lens fixedly received in the lens barrel; and first lens is movable relative to second lens.

9. A lens module, comprising:
   a first lens comprising an optical portion and an edge portion encircled the optical portion, the edge portion comprising a first surface and an opposite second surface;
   a plurality of the first EAP units and a plurality of second EAP units coupled to the first and second surfaces of the edge portion of the first lens, respectively, the first and second EAP units being arranged in a staggered fashion; and
   a lens barrel coupled to first EAP units and second EAP units.

10. The lens module of claim 9, wherein first EAP units and second EAP units are dielectric elastomer or ferroelectric polymer comprising the PVDF and nylon.

11. The lens module of claim 9, further comprising a second lens fixedly received in the lens barrel; and the first lens is movable relative to the second lens.

12. The lens module of claim 1, wherein each of the first and second EAP units is in a strip shape.

13. The lens module of claim 1, wherein the bracket is coupled to another ends of the first and second EAP units.

14. The lens module of claim 6, wherein each of the first and second EAP units is in a strip shape.

15. The lens module of claim 6, wherein another ends of the first and second EAP units are directly coupled to an inner side of the lens barrel.

16. The lens module of claim 9, wherein each of the first and second EAP units is in a strip shape.

17. The lens module of claim 9, wherein one end of the first and second EAP units are directly coupled to the first and second surfaces of the edge portion of the first lens, and another end of the first and second EAP units are directly coupled to an inner side of the lens barrel.

* * * * *